United States Patent
Chen et al.

(10) Patent No.: US 11,408,811 B2
(45) Date of Patent: Aug. 9, 2022

(54) METHODS AND SYSTEMS FOR DETERMINING RESIDUAL FLUID SATURATION OF A SUBSURFACE FORMATION

(71) Applicant: Saudi Arabian Oil Company, Dhahran (SA)

(72) Inventors: Quan Chen, Al Khobar (SA); Subhash Chandrabose Ayirala, Dhahran (SA); Ali Abdallah Al-Yousef, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 264 days.

(21) Appl. No.: 16/781,080

(22) Filed: Feb. 4, 2020

(65) Prior Publication Data
US 2021/0239002 A1 Aug. 5, 2021

(51) Int. Cl.
*G01N 15/08* (2006.01)
*E21B 43/16* (2006.01)
*E21B 49/08* (2006.01)

(52) U.S. Cl.
CPC ......... *G01N 15/082* (2013.01); *E21B 43/162* (2013.01); *E21B 49/088* (2013.01); *E21B 49/0875* (2020.05)

(58) Field of Classification Search
CPC .... G01N 15/082; G01N 13/00; G01N 23/046; G01R 33/48; G01R 33/5608
See application file for complete search history.

(56) References Cited

U.S. PATENT DOCUMENTS

| | | | | |
|---|---|---|---|---|
| 3,018,660 | A * | 1/1962 | Schmid | G01N 15/082 73/152.09 |
| 4,638,447 | A | 1/1987 | Odeh | |
| 5,209,104 | A | 5/1993 | Collins et al. | |
| 5,297,420 | A | 3/1994 | Gilliland et al. | |
| 6,823,298 | B1 * | 11/2004 | Jones | E21B 49/00 703/10 |
| 8,768,628 | B2 * | 7/2014 | Ghedan | G01N 33/24 166/50 |

(Continued)

FOREIGN PATENT DOCUMENTS

| | | |
|---|---|---|
| CN | 101592027 A | 12/2009 |
| CN | 103698216 A | 4/2014 |

(Continued)

OTHER PUBLICATIONS

Anderson, "Wettability Literature Survey—Part 2: Wettability Measurement," Journal of Petroleum Technology, Nov. 1986, 17 pages. (Year: 1986).*

(Continued)

*Primary Examiner* — David A. Rogers
(74) *Attorney, Agent, or Firm* — Bracewell LLP; Constance G. Rhebergen; Keith R. Derrington (57) ABSTRACT

A method for determining residual fluid saturation of a subsurface formation includes acquiring a sample of the subsurface formation, determining a first residual oil saturation during a water flooding process, determining a second residual oil saturation during a gas flooding process, determining a third residual oil saturation during an enhanced oil recovery (EOR) processes, and determining irreducible water saturation during an oil displacing water process.

18 Claims, 5 Drawing Sheets

(56) References Cited

U.S. PATENT DOCUMENTS

| | | | | |
|---|---|---|---|---|
| 9,341,060 | B2* | 5/2016 | Banian | E21B 49/087 |
| 9,804,062 | B2* | 10/2017 | Collins | G01N 1/00 |
| 10,416,063 | B2* | 9/2019 | Gao | G01N 15/082 |
| 10,545,105 | B2* | 1/2020 | Gao | G01N 24/081 |
| 10,557,333 | B2* | 2/2020 | Nooruddin | E21B 41/0092 |
| 10,633,574 | B2* | 4/2020 | Ma | G01N 33/246 |
| 10,705,068 | B2* | 7/2020 | Youssef | G01N 15/082 |
| 2012/0018160 | A1 | 1/2012 | Al-Yousef et al. | |
| 2015/0323517 | A1* | 11/2015 | Washburn | G01N 33/246 73/73 |
| 2017/0074852 | A1* | 3/2017 | Nguyen | G01N 24/081 |
| 2019/0040303 | A1 | 2/2019 | Ma et al. | |
| 2019/0128790 | A1 | 5/2019 | Gao et al. | |
| 2020/0141212 | A1* | 5/2020 | Bourbiaux | E21B 43/20 |
| 2021/0333258 | A1* | 10/2021 | Chen | G01N 33/24 |

FOREIGN PATENT DOCUMENTS

| | | | | |
|---|---|---|---|---|
| CN | 105332698 | A | 2/2016 | |
| CN | 105372150 | A | 3/2016 | |
| CN | 106285658 | A | 1/2017 | |
| CN | 108414560 | A | 8/2018 | |
| CN | 108487904 | A | 9/2018 | |
| CN | 108507919 | A | 9/2018 | |
| CN | 108680482 | A | 10/2018 | |
| CN | 109781600 | A | 5/2019 | |
| EP | 2341372 | A1 | 7/2011 | |
| WO | WO-2014139027 | A1 * | 9/2014 | C09K 8/035 |
| WO | 2018022956 | A1 | 2/2018 | |
| WO | 2019032597 | A1 | 2/2019 | |

OTHER PUBLICATIONS

Brown et al., "Measurements of Fractional Wettability of Oil Fields' Rocks by the Nuclear Magnetic Relaxation Method," 31st Annual Fall Meeting of the Petroleum Branch of the American institute of Mining, Metallurgical, and Petroleum Engineers, Oct. 14-17, 1956, 4 pages. (Year: 1956).*

Craig, "The reservoir engineering aspects of waterflooding,"vol. 3, HL Doherty Memorial Fund of AIME, 1971, 142 pages. (Year: 1971).*

Dixit et al., "Empirical Measures of Wettability in Porous Media and the Relationship between Them Derived from Pore-Scale Modelling," Kluwer Academic Publishers, Jul. 2000, 28 pages. (Year: 2000).*

Evans, "Predicting CO2 injectivity properties for application at CCS sites," Curtin University Department of Petroleum Engineering, Jul. 2014, 160 pages. (Year: 2014).*

Hirasaki et al., "Wettability Evaluation During Restored State Core Analysis," Fourth Annual Technical Conference of the Society of Core Analysts, Aug. 15-16, 1990, 28 pages. (Year: 1990).*

Honarpour et al., "Relative permeability of petroleum reservoirs," CRC Press, In., Jan. 1986, 178 pages. (Year: 1986).*

Huang et al., "Capillary end effects in coreflood calculations," Journal of Petroleum Science and Engineering, Jan. 1998, 15 pages. (Year: 1998).*

Kallel et al., "Modelling the effect of wettability distributions on oil recovery from microporous carbonate reservoirs," Elsevier Ltd., Jun. 2015, 12 pages. (Year: 2015).*

Morrow "Wettability and Its Effect on Oil Recovery," Society of Petroleum Engineers SPE Distinguished Author Series, Dec. 1990, 9 pages. (Year: 1990).*

Neilsen et al., "Determination of Saturation Functions of Tight Core Samples Based on Measured Saturation Profiles," Sep. 1997, 11 pages. (Year: 1997).*

Norgaard et al., "Capillary Pressure Curves for Low Permeability Chalk Obtained by NMR Imaging of Core Saturation Profiles," Society of Petroleum Engineers, Jan. 1995, 10 pages (Presented at the SOE Annual Technical Conference and Exhibition, Oct. 22-25, 1995). (Year: 1995).*

Radke et al., "A Pore-Level Scenario for the Development of Mixed Wettability in Oil Reservoirs," Society of Petroleum Engineers, Jun. 1993, 15 pages. (Presented at the 67th Annual Technical Conference and Exhibition of the Society of Petroleum Engineers, Oct. 4-7, 1992). (Year: 1992).*

Ramakrishnan et al., "A new technique to measure static and dynamic properties of a partially saturated porous medium," Chemical Engineering Science vol. 46, No. 4, Dec. 1991, 7 pages. (Year: 1991).*

Richardson et al., "Laboratory Determination of Relative Permeability," Journal of Petroleum Technology, Aug. 1952, 11 pages. (Year: 1952).*

Romanenko et al., "An assessment of non-wetting phase relative permeability in water-wet sandstones based on quantitative MRI of capillary end effects," Journal of Petroleum Science and Engineering, Elsevier Ltd., Sep. 2013, 7 pages. (Year: 2013).*

Salathiel et al., "Oil Recovery by Surface Film Drainage in Mixed-Wettability Rocks," Journal of Petroleum Technology, Oct. 1973, 9 pages. (Year: 1973).*

Al-Mahrooqi et al., "Pore-scale modelling of NMR relaxation for the characterization of wettability," Journal of Petroleum Science and Engineering, Elsevier, vol. 52, No. 1-4, Jun. 2006, 15 pages. (Year: 2006).*

Alsofi, Abdulkareem M. et al.; "Smartwater Synergy With Chemical Enhanced Oil Recovery: Polymer Effects on Smartwater" Feb. 2019 SPE Reservoir Evaluation & Engineering; pp. 61-77.

Chen, Szu-Ying et al.; "New Atomic to Molecular Scale Insights into SmartWater Flooding Mechanisms in Carbonates" SPE-190281-MS, SPE Improved Oil Recovery Conference, Tulsa, OK, Apr. 14-18, 2018; pp. 1-16.

International Search Report and Written Opinion for International Application No. PCT/US2021/070125, report dated May 21, 2021; pp. 1-17.

Kong, Debin et al.; "Experimental investigation on block and transport characteristics of foam in porous media for enhanced oil recovery process" Colloids and Surfaces A 570 (2019); pp. 22-31.

Andersen, Pal O. et al.; "Waterflooding oil-saturated core samples—Analytical solutions for steady-state capillary end effects and correction of residual saturation" Journal of Petroleum Science and Engineering 157 (2017); pp. 364-379.

Huang, David D. et al.; "Capillary End Effects In Coreflood Calculations" 1996 SCA Conference Paper No. 9634, International Symposium of the Society of Core Analysts, Montpellier, France, Sep. 8-10, 1996; pp. 1-10.

* cited by examiner

METHODS AND SYSTEMS FOR DETERMINING RESIDUAL FLUID SATURATION OF A SUBSURFACE FORMATION

TECHNICAL FIELD

Example embodiments relate to methods and systems for determining residual fluid saturation of subsurface formations.

BACKGROUND

Subterranean reservoirs of hydrocarbons, e.g., oil and natural gas, are typically found trapped in permeable subsurface geological formations beneath a layer of impermeable geological formation. In order to estimate the amount of reserves, injectivity, productivity, and to make ultimate-recovery predictions of the hydrocarbon reservoirs, certain petrophysical properties of the subterranean reservoir such as irreducible water saturation, residual oil saturation, capillary pressure, and relative permeability must be determined. Normally, these petrophysical properties are determined by taking core samples from the reservoir and carrying out well-defined measurement techniques on the samples.

Core flooding experiments play a very important role in the measurement of petrophysical properties describing the fluid flow in oil and gas reservoirs. During a conventional core flooding experiment, a cylindrical core is saturated with water or brine, then oil flooded to irreducible water saturation. Subsequently, the core is water flooded or brine flooded and the pressure drop across the core is measured along with the oil and water or brine production. The average fluid saturations within the core are determined from the overall material balance. Similar experiments can also be carried out for gas flooding and enhanced oil recovery (EOR) processes where the core is being flooded by a gas and an EOR agent, respectively.

Capillary end effect can have a significant impact on data acquisition and interpretation of core flooding experiments because it can cause errors in the calculation of saturation and relative permeabilities from pressure drop and production data. Capillary end effects originate from the discontinuity of capillarity at the outlet end of the core sample. The outlet of the core is characterized by a zero capillary pressure which can trap wetting phase in a region near the outlet of the core, potentially leading to a wrongful estimation of parameters. Capillary end effects commonly appear in core flooding processes of oil displacing water in water-wet cores, water displacing oil in oil-wet or mixed-wet cores, and gas-displacing-oil cases. In other displacement processes, capillary end effects are less pronounced than these processes. Experiments of oil displacing water in a water-wet core, or a drainage process, are important, because they establish the end-point oil relative permeability at the irreducible water saturation, which is the starting point of a water flooding (or an imbibition) process. Experiments of water displacing oil in oil-wet or mixed-wet cores are extremely important because they represent water flooding in oil reservoirs, and water flooding is the most common oil recovery method in oil reservoirs. Experiments of the gas-displacing-oil cases are also important, because they represent pattern gas injection and crestal gas injection in oil reservoirs. Capillary end effects in core flood experiments, in some cases, can significantly influence the computation of end-point relative permeabilities and final fluid saturation levels.

SUMMARY

Residual fluid saturations such as residual oil saturation and irreducible water saturation are often determined by core flooding experiments in the laboratory. However, the determined residual oil saturation and irreducible water saturation are often not representative of the reservoir. Because the size of rock core sample is much smaller than the size of a reservoir and an artifact from end effect is induced due to the capillary discontinuity at the outlet end of the rock core sample, without proper correction, the capillary end effect artifact can introduce significant error in residual fluid saturations which has a major impact on evaluating the performance efficiency of different recovery technologies.

In the present disclosure, several methods are disclosed for determining the capillary end effect corrected and reservoir representative residual fluid saturation, such as residual oil saturation during water flooding, gas flooding, and enhanced oil recovery processes, as well as irreducible water saturation during oil displacing water process. The proposed methods include conducting core flooding experiments in steps of increasing injection rate and measuring stabilized average remaining fluid saturation of displaced fluid and differential pressure across the rock core sample for each of the different injection rates. The measured experimental data can be applied using the proposed mathematic formulas and linearly fitted to determine the more realistic residual fluid saturation by the disclosed methods. The disclosed methods can be widely applied to core flooding experiments using a single core or a composite core in the laboratory for determining reservoir representative residual oil saturation and irreducible water saturation.

One example embodiment is a method for determining residual fluid saturation of a subsurface formation includes acquiring a preserved core sample of the oil-bearing subsurface formation, determining a first residual oil saturation during a water flooding process, determining a second residual oil saturation during a gas flooding process, determining a third residual oil saturation during an enhanced oil recovery (EOR) processes, and determining irreducible water saturation during an oil displacing water process.

BRIEF DESCRIPTION OF THE DRAWINGS

So that the manner in which the features, advantages and objects of the invention, as well as others which may become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only example embodiments of the invention and is therefore not to be considered limiting of its scope as the invention may admit to other equally effective embodiments.

DETAILED DESCRIPTION

The present disclosure relates to systems, methods, and computer programs for determining residual fluid saturation of a subsurface formation. The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

Figure 1:
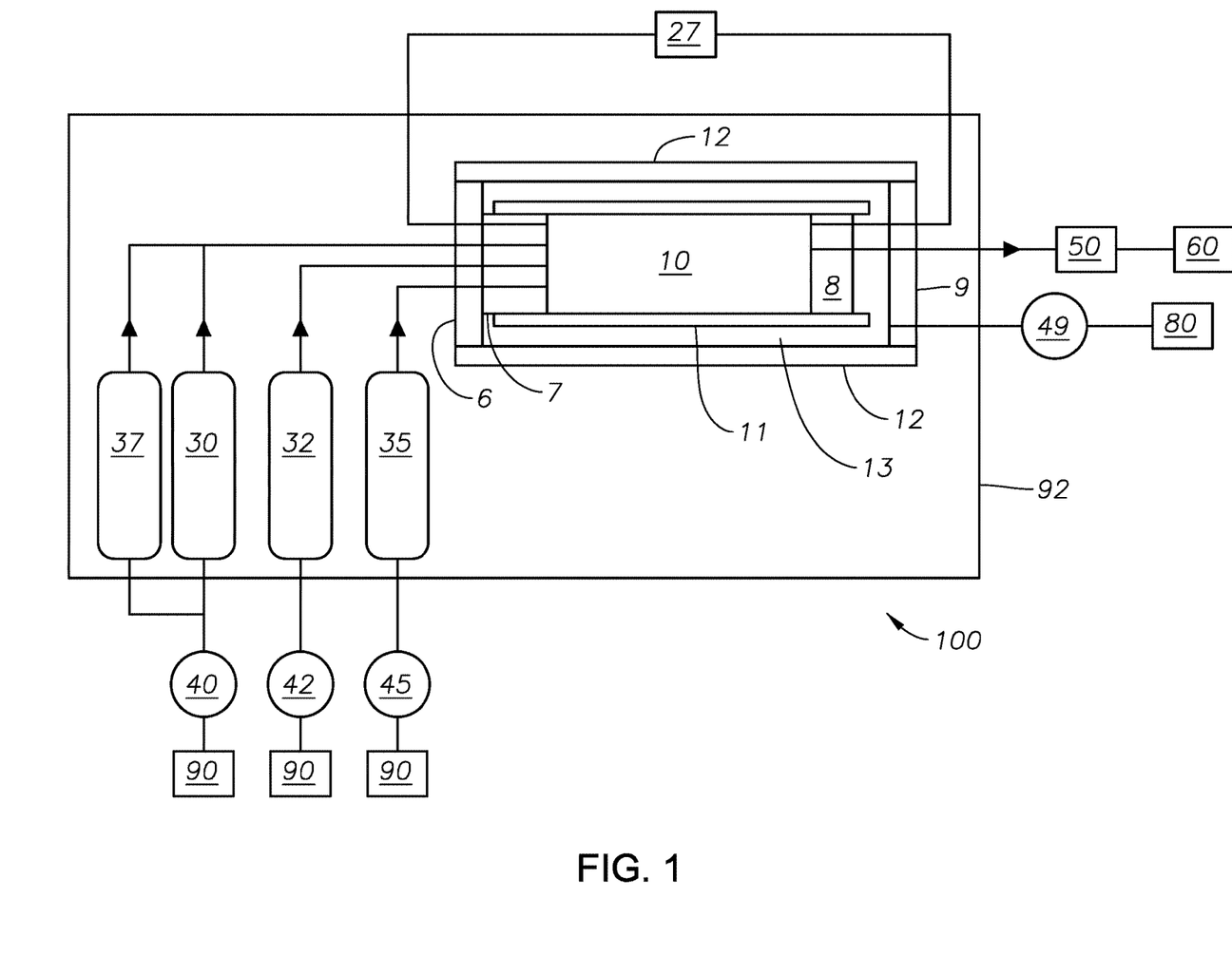
FIG. 1 illustrates an example core flooding system for determining residual fluid saturation of a subsurface formation, according to one example embodiment of the disclosure.

The disclosure provides a core flooding system and core flooding processes for determining residual fluid saturation of a hydrocarbon reservoir. Referring to FIG. 1, illustrated is an example core flooding system 100 for determining residual fluid saturation on a preserved core sample 10 of porous rock from an oil-bearing subterranean reservoir. The core sample 10 of the porous rock, a core inlet end-piece 7, and a core outlet end-piece 8 are placed in an overburden sleeve 11, preferably made of natural or synthetic rubber. The sleeve 11 is in the form of a cylinder surrounding the core sample 10, the core inlet end-piece 7, and the core outlet end-piece 8. The sleeve 11 also provides a fluid barrier between the core sample 10 and a confining fluid in a cavity 13. The sleeve 11 is placed inside a suitable core holder that comprises a core holder body 12, a core holder inlet end-cap 6, and a core holder outlet end-cap 9. The core holder can be pressurized up to several thousand pounds per square inch. The confining fluid 80 is pumped into the cavity 13 surrounding the sleeve 11 in the core holder by a confining fluid pump 49 to maintain a controllable hydrostatic overburden pressure to the sleeve 11 and hence to the core sample 10. A driving fluid 90 is pumped into the bottom of a high pressure floating piston vessel 30 by a pump 40 to inject a first fluid, for example water or brine in the piston vessel 30 into the core sample 10 during a water flooding process. A driving fluid 90 is pumped into the bottom of a high pressure floating piston vessel 35 by a pump 45 to inject a second fluid, for example gas in the piston vessel 35 into the core sample 10 during a gas flooding process. A driving fluid 90 is pumped into the bottom of a high pressure floating piston vessel 37 by the pump 40 to inject a third fluid, for example an EOR agent solution in the piston vessel 37 into the core sample 10 during an EOR process. A driving fluid 90 is pumped into the bottom of a high pressure floating piston vessel 32 by a pump 42 to inject a fourth fluid, for example crude oil obtained from the subterranean reservoir, in the piston vessel 32 into the core sample 10 during an oil displacing water process. The fluids flowing out of the core sample 10 during the water flooding, gas flooding, EOR, and oil displacing water processes flow through a backpressure regulator 50 and then flow into an effluent collection and measurement system 60. The backpressure regulator 50 is utilized to maintain a controllable pore pressure in the core sample 10. The effluent collection and measurement system 60 is utilized to collect and measure the effluent from the core sample 10. The average fluid saturations within the core sample 10 are determined from the overall material balance. The core flooding system 100 includes many flow control valves (not shown) to control the flow of fluids in the system 100. The five arrows shown in the FIG. 1 illustrate the directions of fluid flow in the flow lines of the core flooding system 100. A differential pressure measurement system 27 is utilized to measure the differential pressure across the core sample 10. The core holder and the piston vessels 30, 32, 35, and 37 are placed inside a heating cabinet 92 to maintain a controllable temperature for the core flooding system 100.

The disclosure provides four methods for determining the capillary end effect-corrected and reservoir-representative residual fluid saturation. These four methods can be applied to each of the following processes of (1) water flooding, (2) gas flooding, and (3) enhanced oil recovery (EOR) processes for determining residual oil saturation, and (4) oil displacing water process for determining irreducible water saturation. Each of these methods are explained in further detail in the following sections.

Determining Residual Oil Saturation During Water Flooding, Gas Flooding, and Enhanced Oil Recovery (EOR) Processes After the rock core sample reaches an irreducible water saturation and initial oil saturation condition or using a preserved rock core sample from the oil-bearing subsurface formation, core flooding can be conducted by injecting brine (gas or EOR agent solution) into the rock core sample in steps of increasing injection rate (Q). The next step involves measuring stabilized average remaining displaced fluid (oil) saturation (S) and differential pressure (ΔP) across the rock core sample for each of the different injection rates. The capillary end effect-corrected residual fluid (oil) saturation ($S_1$, $S_2$, $S_3$, and $S_4$ in this case) can be determined using the following four methods, respectively.

Figure 2:
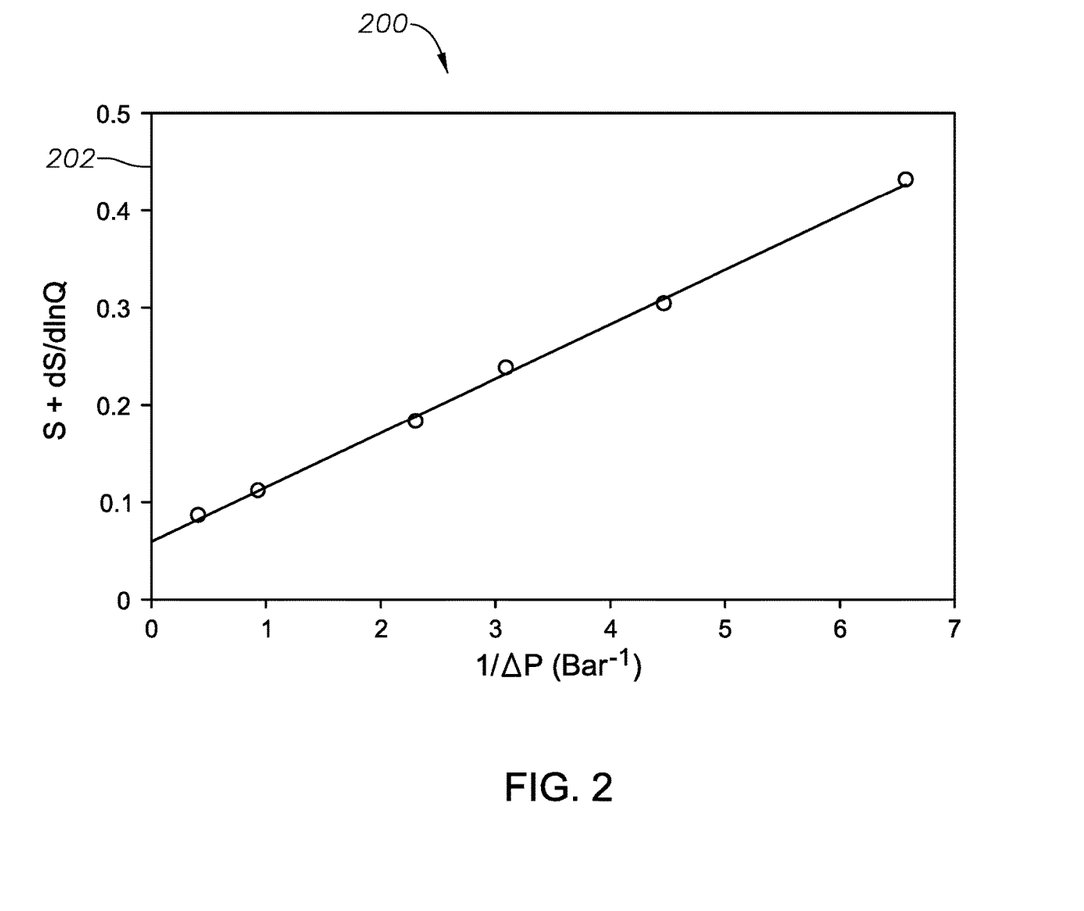
FIG. 2 is an example plot with $S+dS/d\ln Q$ (where $S$ is stabilized average remaining displaced fluid saturation and $Q$ is the injection rate) on Y-axis and reciprocal differential pressure (1/ΔP) on the X-axis and the best linearly fitted line, according to one example embodiment of the disclosure.

In the first method, Equation 1 is applied to determine the residual fluid (oil) saturation ($S_1$) as follows:

$$S + \frac{dS}{d\ln Q} = S_1 + \frac{C_1}{\Delta P} \quad (1)$$

where $C_1$ is a linear fitting parameter. A plot with S+dS/dlnQ on the Y-axis and reciprocal differential pressure (1/ΔP) on the X-axis is linearly fitted, and the capillary end effect-corrected residual fluid (oil) saturation ($S_1$) is determined as the intercept of the plot. FIG. 2 shows a sample graph 200 with S+dS/dlnQ (202) on the Y-axis and reciprocal differential pressure (1/ΔP) on the X-axis and the best linearly fitted line of S+dS/dlnQ=0.06+0.056/ΔP, where $S_1$=0.06 and $C_1$=0.056.

Figure 3:
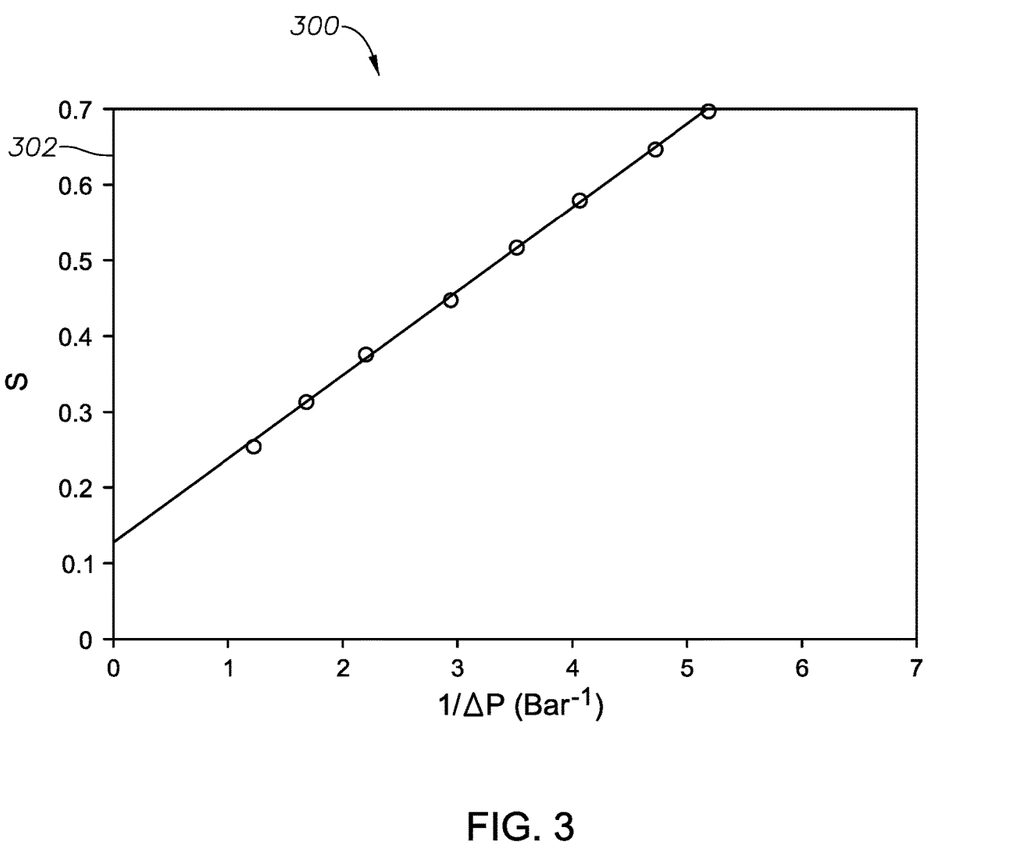
FIG. 3 is an example plot with stabilized average remaining displaced fluid saturation (S) on Y-axis and reciprocal differential pressure (1/ΔP) on the X-axis and the best linearly fitted line, according to one example embodiment of the disclosure.

In the second method, Equation 2 is applied to determine the residual fluid (oil) saturation ($S_2$) as follows:

$$S = S_2 + \frac{C_2}{\Delta P} \quad (2)$$

where $C_2$ is a linear fitting parameter. A plot with S on the Y-axis and reciprocal differential pressure ($1/\Delta P$) on the X-axis is linearly fitted, and the capillary end effect-corrected residual fluid (oil) saturation $S_2$ is determined as the intercept of the plot. FIG. 3 shows a sample graph 300 with S (302) on the Y-axis and reciprocal differential pressure ($1/\Delta P$) on the X-axis and the best linearly fitted line of $S=0.128+0.1107/\Delta P$, where $S_2=0.128$ and $C_2=0.1107$.

Figure 4:
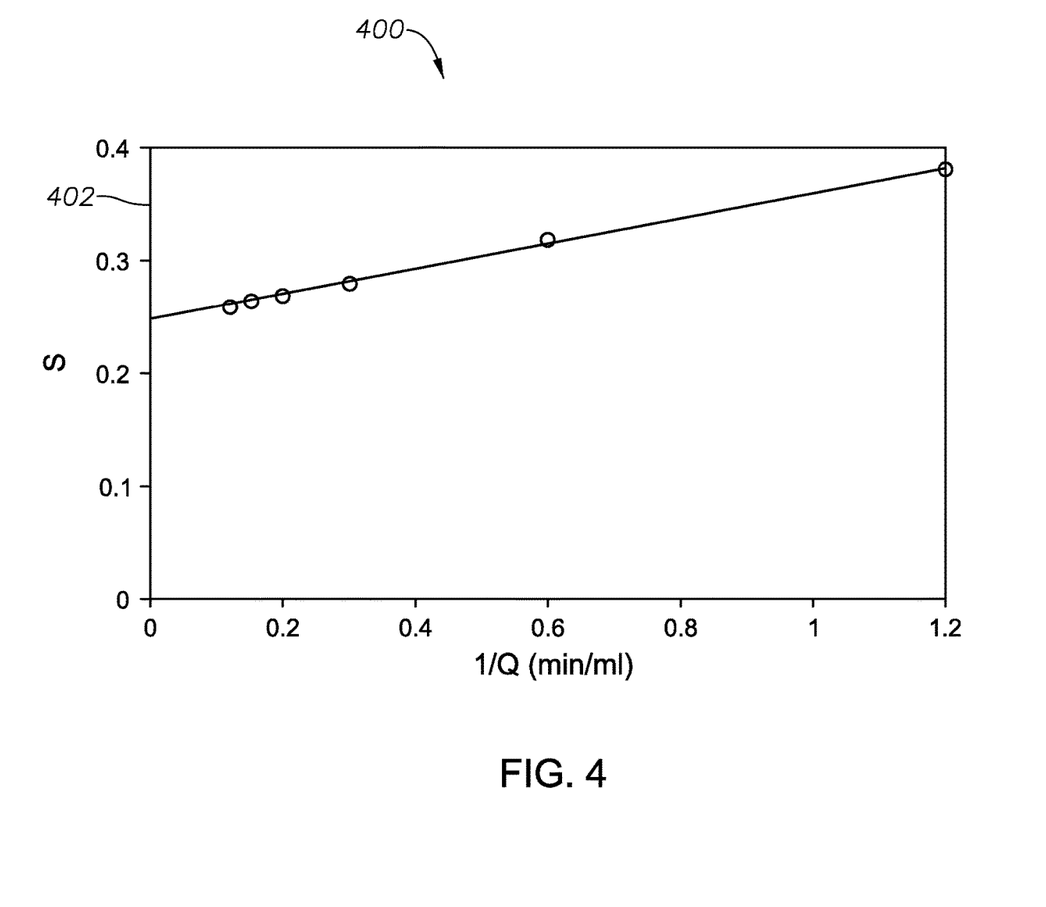
FIG. 4 is an example plot with stabilized average remaining displaced fluid saturation (S) on Y-axis and reciprocal injection rate (1/Q) on the X-axis and the best linearly fitted line, according to one example embodiment of the disclosure.

In the third method, Equation 3 is applied to determine the residual fluid (oil) saturation ($S_3$) as follows:

$$S = S_3 + \frac{C_3}{Q} \qquad (3)$$

where $C_3$ is a linear fitting parameter. A plot with S on the Y-axis and reciprocal injection rate ($1/Q$) on the X-axis is linearly fitted, and the capillary end effect-corrected residual fluid saturation $S_3$ is determined as the intercept of the plot. FIG. 4 shows a sample graph 400 with S (402) on the Y-axis and reciprocal injection rate ($1/Q$) on the X-axis and the best linearly fitted line of $S=0.248+0.1116/Q$, where $S_{3=0.248}$ and $C_3=0.1116$.

In the fourth method, Equation 4 is applied to determine the capillary end effect-corrected residual fluid (oil) saturation ($S_4$) as follows:

$$S_4 = \frac{S_3 + S_2}{2} \qquad (4)$$

where $S_2$ and $S_3$ are determined by the second and third method, respectively. These four methods for determining the residual fluid (oil) saturation can be implemented during the on-going core flooding process. Any lower injection rate data points which are off the linear trend can be discarded and data points at higher injection rate can be acquired, and linearly fitted by the four methods.

Determining Irreducible Water Saturation During Oil Displacing Water Process

As a first step, the core flooding can be conducted by injecting oil into brine saturated rock core sample in steps of increasing injection rate (Q). In the next step stabilized average remaining displaced fluid (water) saturation (S) and differential pressure ($\Delta P$) are measured across the rock core sample for each of the different injection rates. The capillary end effect-corrected residual fluid (irreducible water) saturation ($S_1$, $S_2$, $S_3$, and $S_4$ in this case) can be determined by the four methods using Equations of 1 through 4 in the same way as the determination of the residual oil saturation.

Figure 5:
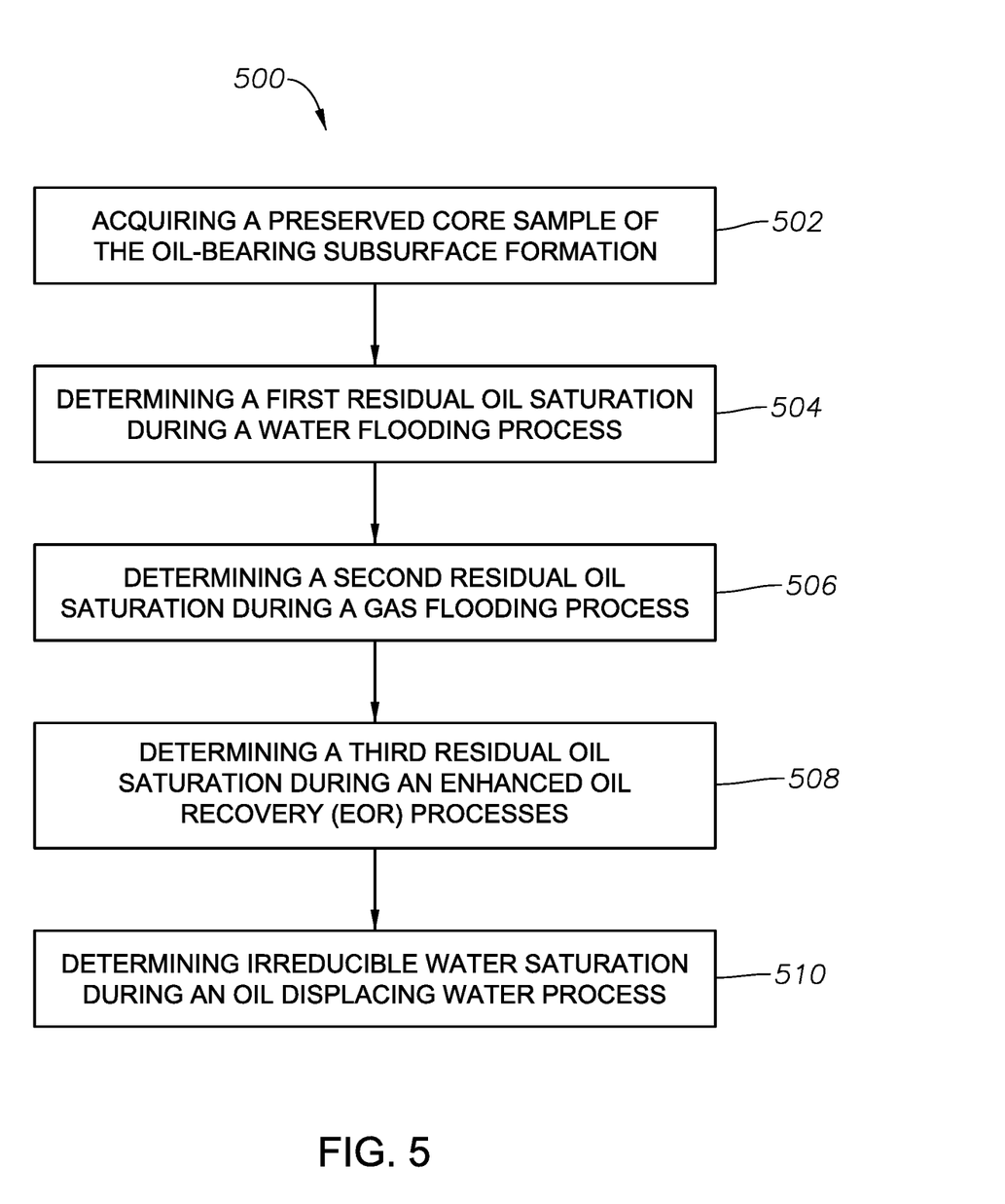
FIG. 5 illustrates example steps in an example method for determining residual fluid saturation of a subsurface formation, according to one example embodiment of the disclosure.

FIG. 5 illustrates example steps in an example method 500 for determining residual fluid saturation of a subsurface formation, according to one example embodiment of the disclosure. At step 502, the method includes acquiring a preserved core sample of the oil-bearing subsurface formation. At step 504, the method includes determining a first residual oil saturation during a water flooding process. At step 506, the method includes determining a second residual oil saturation during a gas flooding process. At step 508, the method includes determining a third residual oil saturation during an enhanced oil recovery (EOR) processes. At step 510, the method includes determining irreducible water saturation during an oil displacing water process. As referred to here, the term "subsurface formation" may include any of shale, limestone, and sandstone, and combinations thereof.

The Specification, which includes the Summary, Brief Description of the Drawings and the Detailed Description, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The systems and methods described herein, therefore, are well adapted to carry out the objects and attain the ends and advantages mentioned, as well as others inherent therein. While example embodiments of the system and method have been given for purposes of disclosure, numerous changes exist in the details of procedures for accomplishing the desired results. These and other similar modifications may readily suggest themselves to those skilled in the art, and are intended to be encompassed within the spirit of the system and method disclosed herein and the scope of the appended claims.

The invention claimed is:

1. A method for determining residual fluid saturation of a subsurface formation, the method comprising:
    (i) acquiring a sample of the subsurface formation;
    (ii) determining a first residual oil saturation of the sample during a water flooding process;
    (iii) determining a second residual oil saturation of the sample during a gas flooding process;
    (iv) determining a third residual oil saturation of the sample during an enhanced oil recovery (EOR) processes; and
    (v) determining irreducible water saturation of the sample during an oil displacing water process.

2. The method according to claim 1, wherein the step of determining the first residual oil saturation during the water flooding process further comprises injecting water or a combination of water and an agent into the sample at a plurality of injection rates in increments of Q.

3. The methods according to claim 2, further comprising: measuring stabilized average remaining oil saturation (S) and differential pressure ($\Delta P$) across the sample for each of the plurality of injection rates.

4. The method according to claim 3, further comprising: determining the capillary end effect-corrected residual fluid (oil) saturation ($S_1$) using the formula:

$$S + \frac{dS}{d\ln Q} = S_1 + \frac{C_1}{\Delta P}$$

where $C_1$ is a linear fitting parameter.

5. The method according to claim 4, wherein the capillary end effect-corrected residual fluid (oil) saturation ($S_1$) is the intercept of a curve with S+dS/dlnQ on the Y-axis and reciprocal differential pressure (1/$\Delta P$) on the X-axis.

6. The method according to claim 3, further comprising: determining the residual fluid (oil) saturation ($S_2$) using the formula:

$$S = S_2 + \frac{C_2}{\Delta P}$$

where $C_2$ is a linear fitting parameter.

7. The method according to claim 6, wherein the capillary end effect-corrected residual fluid (oil) saturation ($S_2$) is the intercept of a curve with S on the Y-axis and reciprocal differential pressure (1/$\Delta P$) on the X-axis.

8. The method according to claim 4, further comprising: determining the residual fluid (oil) saturation ($S_3$) using the formula:

$$S = S_3 + \frac{C_3}{Q}$$

wherein $C_3$ is a linear fitting parameter.

9. The method according to claim 8, wherein the capillary end effect-corrected residual fluid (oil) saturation ($S_3$) is the intercept of a curve with S on the Y-axis and reciprocal injection rate (1/Q) on the X-axis.

10. The method according claim 9, further comprising: determining the capillary end effect-corrected residual fluid (oil) saturation ($S_4$) using the formula:

$$S_4 = \frac{S_3 + S_2}{2}.$$

11. The method according to claim 1, wherein the step of determining the second residual oil saturation during the gas flooding process further comprises injecting gas or a combination of gas and brine into the sample at a plurality of injection rates in increments of Q.

12. The methods according to claim 11, further comprising:
measuring stabilized average remaining oil saturation (S) and differential pressure ($\Delta P$) across the sample for each of the plurality of injection rates.

13. The method according to claim 1, wherein the step of determining the third residual oil saturation during the EOR process further comprises injecting an EOR agent into the sample at a plurality of injection rates in increments of Q.

14. The methods according to claim 13, further comprising:
measuring stabilized average remaining oil saturation (S) and differential pressure ($\Delta P$) across the sample for each of the plurality of injection rates.

15. The method according to claim 1, wherein the step of determining irreducible water saturation during the oil displacing water process further comprises injecting oil into the sample at a plurality of injection rates in increments of Q.

16. The method according to claim 15, further comprising:
measuring stabilized average remaining water saturation (S) and differential pressure ($\Delta P$) across the sample for each of the plurality of injection rates.

17. The method according claim 16, further comprising: determining the capillary end effect-corrected irreducible water saturation $S_1$, $S_2$, $S_3$, and $S_4$ during oil displacing water process using the formulas in claims 4, 6, 8, and 10, respectively.

18. The method according to claim 1, wherein the subsurface formation comprises at least one of shale, limestone, and sandstone. for each of the plurality of injection rates.

* * * * *

UNITED STATES PATENT AND TRADEMARK OFFICE
CERTIFICATE OF CORRECTION

PATENT NO.       : 11,408,811 B2
APPLICATION NO.  : 16/781080
DATED            : August 9, 2022
INVENTOR(S)      : Quan Chen, Subhash Chandrabose Ayirala and Ali Abdallah Al-Yousef It is certified that error appears in the above-identified patent and that said Letters Patent is hereby corrected as shown below:

In the Claims

In Claim 16, Column 8, Line 35, reads:
"water saturation"
It should read:
"oil saturation"

In Claim 18, Column 8, Line 45, reads:
"limestone, and sandstone. for each of the plurality of injection rates."
It should read:
"limestone, and sandstone."

Signed and Sealed this
Eleventh Day of October, 2022

*Katherine Kelly Vidal*

Katherine Kelly Vidal
*Director of the United States Patent and Trademark Office*